United States Patent [19]

Pierce

[11] Patent Number: 4,693,129
[45] Date of Patent: Sep. 15, 1987

[54] COUNTERSHAFT AUTOMATIC TRANSMISSION

[75] Inventor: Stanley L. Pierce, Northville, Mich.

[73] Assignee: Ford Motor Company, Dearborn, Mich.

[21] Appl. No.: 624,317

[22] Filed: Jun. 25, 1984

[51] Int. Cl.⁴ .............................................. F16H 3/08
[52] U.S. Cl. .................................................... 74/333
[58] Field of Search ................. 74/333, 330, 331, 356, 74/359

[56] References Cited

U.S. PATENT DOCUMENTS

| | | | |
|---|---|---|---|
| 2,238,370 | 4/1941 | Peterson | 74/333 |
| 2,315,808 | 4/1943 | Miller | 74/330 |
| 2,599,801 | 6/1952 | Youngren et al. | 74/330 |
| 2,612,787 | 10/1952 | Youngren et al. | 74/330 |
| 2,644,340 | 7/1953 | Youngren et al. | 74/330 |
| 2,654,261 | 10/1953 | Youngren et al. | 74/336 |
| 2,774,451 | 12/1956 | Stump | 74/333 |
| 3,186,081 | 6/1965 | Barisch | 74/333 |
| 3,319,479 | 5/1967 | Iavelli et al. | 74/333 |
| 3,643,520 | 2/1972 | Andrushkiw et al. | 74/333 |
| 3,769,857 | 11/1973 | Whateley | 74/330 |
| 4,375,172 | 3/1983 | Richards et al. | 74/331 |
| 4,485,687 | 12/1984 | Burke et al. | 74/333 X |

FOREIGN PATENT DOCUMENTS

| | | | |
|---|---|---|---|
| 3037990 | 5/1982 | Fed. Rep. of Germany | 74/330 |
| 2081825 | 2/1982 | United Kingdom | 74/331 |
| 2095774 | 10/1982 | United Kingdom | 74/330 |

Primary Examiner—Leslie Braun
Assistant Examiner—David Novais
Attorney, Agent, or Firm—Frank G. McKenzie; Donald J. Harrington

[57] ABSTRACT

An automatic transmission for an automotive vehicle that transmits torque from an engine crankshaft to an outlet shaft includes a first clutch whose engagement driveably connects the engine directly to the output shaft and a second clutch whose engagement connects the engine to a countershaft on which a gear wheel having multiple pinions is formed. The output shaft has multiple forward drive output gears and a reverse output gear journalled on its outer surface. The countershaft has a forward drive pinion in continuous meshing engagement with a forward drive output gear, which is selectively connected to the output shaft by a synchronizer or coupler. A reverse idler gear wheel is in continuous engagement with the forward drive output pinion and with a reverse drive output gear that is connected to the output shaft by the synchronizer. A second synchronizer or coupler driveably connects selected forward drive gears to the output shaft.

6 Claims, 2 Drawing Figures

| Speed Ratio Shift | Clutch 32 | Clutch 18 | Engagement Of Synchronizer Clutch 56 With | |
|---|---|---|---|---|
| | | | Gear 54 | Gear 52 |
| N-1 | On | — | — | — |
| 1-2 PT | Off | On/Off | — | On |
| 1-2 BO | Off | — | — | On |
| 2-3 PT | — | On/Off | On | Off |
| 2-3 BO | On/Off | — | On | Off |
| 3-4 PT | — | On | Off | — |
| 3-4 BO | On/Off | On | Off | — |
| 4-3 CT | On/Off | Off | On | — |
| 4-3 KD | — | Off | On | — |
| 3-2 CT | On/Off | — | Off | On |
| 3-2 KD | — | On/Off | Off | On |
| 2-1 CT | On | — | — | Off |
| 2-1 KD | On | On/Off | — | Off |

PT: Part Or Full Throttle
BO: Backout
CT: Closed Throttle
E: Engine

COUNTERSHAFT AUTOMATIC TRANSMISSION

BACKGROUND OF THE INVENTION

1. Field of the Invention

This invention relates to the field of automatic power transmissions and, in particular, to such transmissions having a countershaft connected to a power source through a clutch.

2. Description of the Prior Art

Automatic transmissions usually include a hydraulic torque converter or fluid coupling located between the engine and the gear arrangement. These devices require a large, continuously pressurized hydraulic system and operate at fairly low efficiency over a substantial portion of their operating range. A preferred automatic transmission would not require the torque converter or hydraulic coupling but would require only a small oil pump to pressurize a much smaller capacity hydraulic system for operating the clutches and servos that engage the several speed ratios.

It is necessary that an automatic transmission, particularly one for use in a vehicle whose engine and transmission are transversely mounted, require only a small space and that its overall dimension that extends in the transverse direction be as short as possible. Preferably, an automatic transmission would permit several aligned and coaxial input shafts to cooperate and in this way reduce the length that the transmission occupies between the drive wheels of the vehicle. The length of the transmission can be minimized if the number of gear wheels supported by the output shaft and by the countershaft is a minimum number of speed ratios that can be produced by the transmission. U.S. Pat. Nos. 2,599,801, 2,612,787, 2,654,261 and 2,644,340 describe multiple countershaft transmissions in which ratio changes are produced by friction clutches that are selectively engaged and disengaged in order to produce the gear ratios. These transmissions are particularly concerned with maintaining an uninterrupted flow of power from the engine to the output shaft of the transmission during speed ratio changes. U.S. Pat. No. 2,466,318 describes an automatic transmission having a single countershaft that supports gears fixed to the outer surface of the countershaft. One friction clutch connects the engine shaft to a pinion that drives the crankshaft in rotation; a second friction clutch joins the engine shaft to the output shaft of the transmission.

SUMMARY OF THE INVENTION

An automatic automotive transmission for producing multiple ratios of the speeds of the engine crankshaft and the output shaft of the transmission according to this invention includes an input pinion formed integrally with the housing of a first friction clutch whose engagement directly connects the engine to the output shaft. A countershaft and the output shaft carry multiple pairs of meshing gears and pinions including a first group of such gear-pinion pairs whose gears are journalled on the output shaft and whose pinions are journalled on the countershaft. A forward drive output gear journalled on the output shaft is in continuous meshing engagement with a forward drive pinion formed integrally with the countershaft, which is driven when a second clutch engages a gear wheel driven by the input pinion. The pinions of the first group of gear-pinion pairs and the input gear are formed integrally with the gear wheel. A first coupler, which may be a synchronizer clutch, selectively, driveably connects a gear of a gear-pinion pair belonging to the first group of such pairs to the output shaft. A second coupler, which may be a synchronizer clutch, selectively, driveably connects the forward drive output gear to the output shaft. A reverse idler is in continuous meshing engagement with the forward drive pinion and is formed on a gear wheel integrally with a reverse pinion that is in continuous meshing engagement with a reverse output gear journalled on the output shaft. The second coupler is adapted to connect either the reverse output gear or the forward output gear to the output shaft of the transmission.

The transmission according to this invention can be adapted to produce any number of forward speed ratios and can produce upshifts and downshifts among the various speed ratios by employing the appropriate number of geared torque paths, couplers and controllers for engaging the couplers.

The friction clutch that is mounted on the output shaft is a high gear clutch and directly connects the engine crankshaft to the output shaft of the transmission. When this clutch is applied, the speed of the engine can be reduced to the synchronous speed required to make engagement of the coupler with numerically higher speed ratios than the first speed ratio. This clutch is also used to release the torque load on an engaged dog tooth coupler and to change engine speed during part throttle and full throttle upshifts and during forced downshifts. When synchronization is made between the speed of the output shaft and the speed of the gear corresponding to the speed ratio to which the transmission is being shifted, the dog tooth coupler associated with this speed ratio is engaged and then the high gear clutch is released completing the ratio change. The friction clutch mounted on the output shaft is a low gear clutch and is used for start-up acceleration of the vehicle. Engagement of this clutch during closed throttle conditions can increase the engine speed to the speed that will produce synchronism between the speed of the output shaft and that of the forward output gear to which the output shaft is joined by the associated coupler. Therefore, the low gear clutch is used in coast torque conditions to accelerate the engine for a closed throttle downshift or to release torque on a dog tooth coupler in order to disengage the coupler from a gear for a backout or closed throttle manual upshift.

DESCRIPTION OF THE PREFERRED EMBODIMENT

Figures 1, 2:
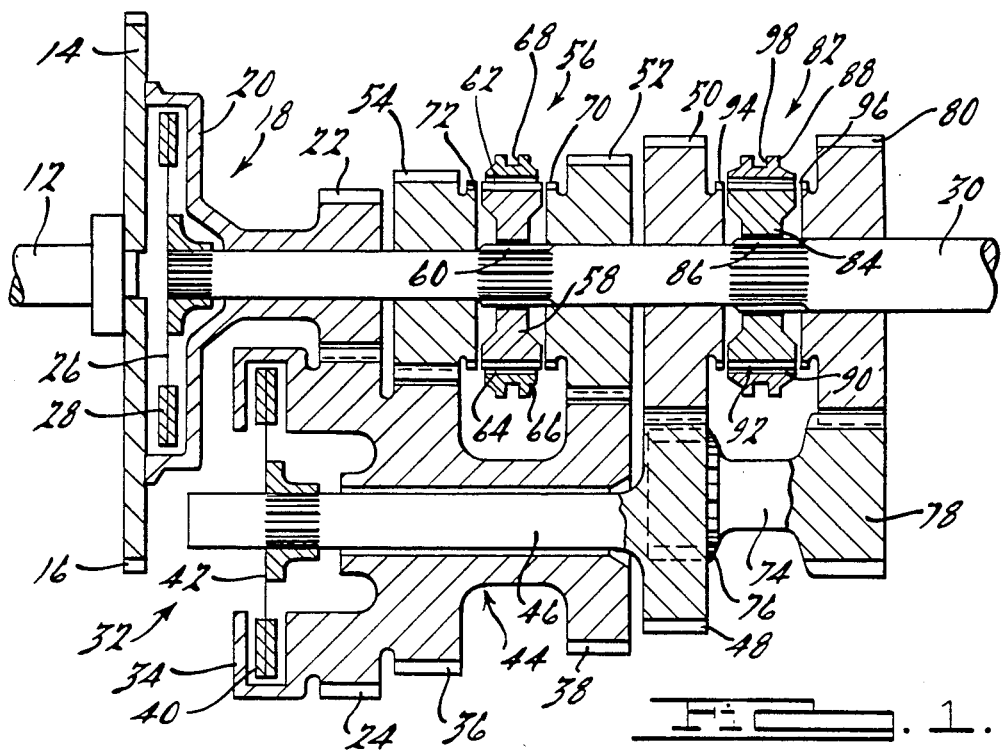
FIG. 1 is a cross section through the output shaft, countershaft and reverse idler shaft showing the several gear pairs, coupler and clutches of a transmission according to this invention.
FIG. 2 is a schedule showing the operation of the clutches and couplers required in making ratio changes in a transmission according to this invention.

Referring first to FIG. 1, the crankshaft 12 of an engine used in an automotive vehicle to drive the wheels of the vehicle through the transmission has a flywheel 14 formed with a starting gear 16 that is engaged by a pinion driven by a starting motor. A first clutch 18 has a housing 20 connected directly to the flywheel and formed integrally with an input pinion 22, which is in continuous meshing engagement with the gear 24. The clutch includes a clutch disk 26 formed with a friction element 28 that is adapted to engage either the flywheel or the housing or both of these in order to produce a frictional driving engagement between shaft 12 and the output shaft 30 of the transmission.

A second clutch 32 includes a housing 34 that is formed integrally with or is driveably connected to gear wheel 44, which receives journalled support from shaft 46 and on which pinions 24, 36 and 38 are formed. When clutch 32 is engaged, the friction element 40 carried by the clutch disk 42 produces a frictional driving engagement between gear wheel 44 and the countershaft 46, which is mounted in the transmission casing for rotation about its axis parallel to output shaft 30 for rotation about its axis. The countershaft is formed integrally with a first speed ratio pinion 48 located on the end of the countershaft opposite second clutch 32. First ratio pinion 48 is in continuous meshing engagement with the first ratio gear 50 carried by the output shaft. Second speed ratio pinion 38 is in continuous meshing engagement with second speed ratio gear 52 carried by the output shaft. Third speed ratio pinion 36 is in continuous meshing engagement with third ratio output gear 54 carried by the output shaft.

A first synchronizer clutch or coupler means 56 located between gears 52 and 54 on shaft 30 includes a hub 58 that is connected to the shaft by a spline 60 and has multiple axially directed clutch teeth 62 formed on its outer circumference, which teeth are engaged by the teeth 64 formed on the inner surface of clutch sleeve 66. The control system of the transmission includes a shift fork that engages a recess 68 formed on the sleeve, whereby the sleeve is moved rightward and leftward on the clutch teeth into engagement with dog teeth 70, 72 that are formed on gears 52 and 54, respectively. When the shift fork is moved leftward, sleeve 66 engages dog teeth 72 while maintaining engagement with teeth 62 on the synchronizer clutch hub so that gear wheel 54 is driveably connected to shaft 30. When sleeve 66 is moved rightward, its teeth engage dog teeth 70 and maintain engagement with teeth 62 on the clutch hub thereby driveably connecting gear 52 to shaft 30.

A reverse drive gear wheel 74 mounted for rotation parallel to the axes of shafts 30 and 46 includes reverse idler 76, which is in continuous meshing engagement with the first forward speed ratio pinion 48, and a reverse pinion 78, which is in continuous meshing engagement with a reverse output gear 80 carried on the output shaft. Gears 80 and 50 are journalled on the outer surface of shaft 30. A second synchronizer clutch or coupler means 82 includes a hub 84, which is driveably connected to shaft 30, and slidably mounted sleeve 88, which has clutch teeth 90 formed on its inner surface adapted to engage the teeth 92 formed on the outer surface of the hub 84. Gears 50 and 80 have dog teeth 94 and 96, respectively, which are engaged by the internal teeth of sleeve 88 as the sleeve is moved leftward and rightward by a shift fork fitted within recess 98 formed on the sleeve and moved in accordance with the control of the transmission control system. When sleeve 88 is moved leftward into engagement with dog teeth 94, gear 50 is driveably connected to output shaft 30. When sleeve 88 is moved rightward from its neutral position shown in FIG. 1 into engagement with dog teeth 96, gear 80 is driveably connected to output shaft 30.

During operation in the first speed ratio, clutch 32 is engaged and clutch 18 is disengaged. Power is transmitted from the engine shaft 12, to input pinion 22, clutch 32, countershaft 46, first speed ratio pinion 48, forward output gear 50, coupler 82 and output shaft 30. The sleeve 88 of synchronizer 82 is moved leftward to connect gear 50 to the output shaft whenever forward drive is required and is moved righward to connect gear 80 to output shaft 30 for reverse drive operation.

A ratio change from the first speed ratio to the second speed ratio occurs when clutch 32 is disengaged and coupler 56 is moved from the neutral position, shown in FIG. 1, to engage dog teeth 70 and thereby to connect gear 52 to output shaft 30. However, in order to effect synchronous motion of shaft 30 and gear 52 while making a speed ratio change from the first to the second ratio, clutch 18 first is engaged partially until synchronism, is established between the speed of engine shaft 12 and output shaft 30. When syncrhonism is established, sleeve 66 then can engage dog teeth 70 on gear 52. After this connection is made, clutch 32 is engaged, and then clutch 18 is disengaged from its partial engagement. The torque delivery path for the second forward speed ratio includes clutch 18, input pinion 22, gear 24, second ratio pinion 38, second ratio output gear 52, coupler clutch 56 and output shaft 30.

A change of ratio from the second to the third speed ratio at part throttle or full throttle is effected by engaging clutch 18 for the brief period required to accelerate shaft 30 and then shifting coupler 56 into engagement with gear 54. After synchronous speed is reached and coupler 56 is connected to gear 54, clutch 18 is disengaged. The torque delivery path for the third forward speed ratio operation includes shaft 12, input pinion 22, gear 24, third speed ratio pinion 36, third speed ratio output gear 54, coupler 56 and shaft 30.

A change of gear ratio from the third to the fourth speed ratio occurs by continuously engaging clutch 18 and disengaging coupler 56 from gear 54 and returning it to the neutral position. In this way a direct drive connection is established between crankshaft 20 and output shaft 30 through clutch 18.

During coasting downshifts from the fourth ratio to the third ratio, clutch 32 is engaged partially for a brief period in order to accelerate gear 54 to a speed synchronous with output shaft 30. When synchronous speed is reached, coupler 56 is moved to engagement with the dog teeth 72 on gear 54, thereby connecting gear 54 to shaft 30, and clutch 32 is disengaged. Similarly, a coasting downshift from the third ratio to the second ratio is effected by partially, briefly engaging clutch 32 in order to accelerate gear 52 to the speed of shaft 30, moving coupler 56 into engagement with gear 52, and then disengaging clutch 32. A coasting downshift from the second to the first ratio is effected by continuously engaging clutch 32 and moving coupler 56 to the neutral position shown in FIG. 1.

An upshift to the third speed ratio from the second ratio can be made as the engine throttle is released by applying clutch 32, moving coupler 56 into engagement with gear 54, and then releasing clutch 32. Similarly, an upshift from the third ratio to the fourth ratio can be made while the engine throttle is released by engaging clutch 32, disengaging coupler 56 from gear 54 and then releasing clutch 32.

A forced downshift from the fourth ratio to the third ratio with the engine throttle open is made by maintaining clutch 18 engaged and moving coupler 56 into engagement with gear 54. A downshift from the third ratio to the second ratio with the engine throttle open is effected by applying clutch 32, moving coupler 56 out of engagement with gear 54 and into engagement with gear 52, and then releasing clutch 32. A forced downshift from the second ratio to the first ratio with the engine throttle open is effected by applying clutch 32, engaging clutch 18, moving coupler 56 out of engagement with gear 52 to the neutral position shown in FIG. 1, and then releasing clutch 18.

High gear clutch 18 driveably connects the engine with the output shaft and therefore can be used to hold the engine speed and the speed of the gear wheel journalled on the countershaft down to synchronous speed for engagement at lower than the 1:1 ratio. Clutch 18 is used to release torque load on the engaged synchronizer clutch or coupler and to change engine speed during part throttle and full throttle upshifts and during forced downshifts. When synchronous speed is achieved for the gear ratio to which the shift is being made following the engagement of clutch 18, the synchronizer or coupler is engaged and then the clutch is released to complete the ratio change.

Low gear clutch 32 is used to accelerate the vehicle after start-up. This clutch is used during coast torque conditions, i.e., when engine speed is decreased for a closed throttle downshift or to release torque on the dog teeth of the gears in order to disengage the coupler from the dog teeth for a backout or closed throttle manual upshift.

For reverse operation, coupler 82 is moved out of engagement with dog teeth 94 and into engagement with dog teeth 96 on reverse output gear 80. In reverse drive, the application of clutch 32 driveably connects crankshaft 12 and pinion 22 to reverse output gear 80 through the following intermediate drive components: countershaft 46, pinion 48, reverse idler 76, reverse pinion 78, reverse output gear 80 and coupler 82.

All forward speed ratios, except for the first ratio, can be produced by disengagement of coupler 82 from gear 50 while clutch 18 is engaged. However, engagement of clutch 82 with forward output gear 50 is necessary for engine shaft synchronization to result by the engagement of low clutch 32. Alternatively, the forward speed ratios, except for the low ratio, can be produced with low gear clutch 32 disengaged and coupler 82 engaged with forward output gear 50.

Clutches 18 and 32 may be actuated by pressurized oil, vacuum, compressed air or by electrical means. The couplers can be any conventional spring loaded clutch, dump and fill coupling or any combination of these.

Having described a preferred embodiment of my invention, what I claim and desire to secure by U.S. patents is:

1. A multiple speed ratio transmission for use in delivering torque from an engine comprising:
   an output shaft;
   an input pinion continuously driven by the engine;
   first clutch means for selectively connecting the engine to the output shaft;
   a countershaft mounted for rotation parallel to the output shaft;
   gearing defining multiple pairs of meshing gears and pinions including a first group of such pairs having the gears rotatably mounted on the output shaft and the pinions formed integrally with a gear wheel, said pinions being rotatably mounted on the countershaft and driven from the input pinion, said gearing further includes a second gear-pinion pair having the gear of said second gear-pinion pair rotatably mounted on the output shaft and the pinion of said second gear-pinion pair non-rotatably connected to the countershaft;
   second clutch means for selectively driveably connecting the input pinion to the countershaft;
   first coupler means for selectively driveably connecting the gear of a gear-pinion pair of the first group to the output shaft; and
   second coupler means for selectively driveably connecting the gear of the second gear-pinion pair to the output shaft.

2. The transmission of claim 1 further comprising:
   a reverse drive path that includes a reverse idler in meshing engagement with the pinion of the second gear-pinion pair;
   a reverse pinion mounted for rotation with the reverse idler;
   a reverse output gear carried by the output shaft in meshing engagement with the reverse pinion; and
   wherein the second coupling means selectively driveably connects the reverse output gear to the output shaft.

3. The transmission of claim 1 further comprising a gear wheel rotatably mounted on the surface of the countershaft that includes the pinions of the first group of meshing gear and pinion pairs and an input gear in meshing engagement with the input pinion.

4. The transmission of claim 1 wherein the first clutch includes a housing that continuously connects the engine to the input pinion, and a rotor fixed to the output shaft adapted to selectively driveably engage the housing, whereby the engine is connected to the output shaft.

5. The transmission of claim 1 wherein the second clutch includes a housing continuously driven by the input pinion, and a rotor fixed to the countershaft adapted to selectively driveably engage the housing, whereby the engine is connected to the countershaft.

6. The transmission of claim 3 wherein the second clutch includes a housing formed integrally with the gear wheel, and a rotor fixed to the countershaft adapted to selectively, driveably engage the housing, whereby the engine is connected to the countershaft.

* * * * *